(12) United States Patent
Im

(10) Patent No.: US 9,377,811 B2
(45) Date of Patent: Jun. 28, 2016

(54) ELECTRONIC APPARATUS, METHOD OF CONTROLLING ELECTRONIC APPARATUS AND COMPUTER-READABLE RECORDING MEDIUM

(71) Applicant: Samsung Electronics Co., Ltd, Suwon-si, Gyeonggi-do (KR)

(72) Inventor: Kyung-il Im, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/324,292

(22) Filed: Jul. 7, 2014

(65) Prior Publication Data

US 2015/0185866 A1 Jul. 2, 2015

(30) Foreign Application Priority Data

Dec. 30, 2013 (KR) .......................... 10-2013-0166390

(51) Int. Cl.
*G06F 3/02* (2006.01)
*G06F 1/16* (2006.01)
*G06F 1/32* (2006.01)

(52) U.S. Cl.
CPC .............. *G06F 1/162* (2013.01); *G06F 1/1643* (2013.01); *G06F 1/1677* (2013.01); *G06F 1/3287* (2013.01); *G06F 2200/1637* (2013.01); *Y02B 60/1282* (2013.01)

(58) Field of Classification Search
CPC ... G06F 1/1681; G06F 1/1684; G06F 1/1618; G06F 11/3089; G06F 1/1616; G06F 1/1677; G06F 1/166; G06F 1/1679; G06F 1/162
See application file for complete search history.

(56) References Cited

U.S. PATENT DOCUMENTS

| 7,239,505 | B2 | 7/2007 | Keely et al. | |
|---|---|---|---|---|
| 7,551,426 | B2 | 6/2009 | Huang et al. | |
| 8,151,105 | B2 | 4/2012 | Park et al. | |
| 2010/0134412 | A1* | 6/2010 | Narita | G06F 1/1616 345/156 |
| 2012/0162889 | A1* | 6/2012 | Han | G06F 1/162 361/679.09 |
| 2014/0218854 | A1* | 8/2014 | Onda | G06F 1/1601 361/679.06 |
| 2014/0281444 | A1* | 9/2014 | Waltermann | G06F 1/162 713/1 |
| 2014/0292626 | A1* | 10/2014 | Park et al. | 345/87 |
| 2014/0292646 | A1* | 10/2014 | Kawamoto | G06F 3/01 345/156 |
| 2014/0299740 | A1* | 10/2014 | Peng | G06F 1/1632 248/688 |
| 2014/0355189 | A1* | 12/2014 | Nakano | G06F 1/1632 361/679.11 |
| 2014/0375194 | A1* | 12/2014 | Arima | G06F 1/1616 312/322 |

FOREIGN PATENT DOCUMENTS

| JP | 2002-258982 | 9/2002 | |
|---|---|---|---|
| JP | WO 2013114503 A1 * | 8/2013 | ............ G06F 1/1616 |
| KR | 10-1005660 | 12/2010 | |
| WO | WO 2013114503 A1 * | 8/2013 | |

* cited by examiner

*Primary Examiner* — Lixi C Simpson
(74) *Attorney, Agent, or Firm* — Staas & Halsey LLP

(57) ABSTRACT

An electronic apparatus includes a keyboard configured to receive a user manipulation command, a display configured to display an image according to the received manipulation command, a link unit configured to connect the keyboard with the display, a first detector configured to detect a disposition of the keyboard and the display, a second detector configured to detect a rotation of the display, and a controller configured to control at least one of an operation state of the keyboard and a function of the electronic apparatus according to the detected disposition and rotation.

15 Claims, 12 Drawing Sheets

FIG. 4

| Image | LCD Mode | Power Saving | Lid switch | (Gyro+ Accelerometer) | touch screen |
|---|---|---|---|---|---|
| 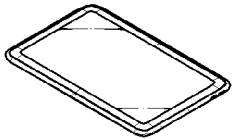 | Tablet | Input Device Off(Keyboard, Touch Pad) + Ports and external Storage device in the Link Part off | Off | x=0<br>y=0<br>z=-1 | On |
| 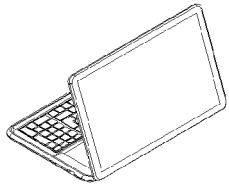 | Stand | Certain Input Device On (Touch screen Off) | On | x=0<br>y=1<br>z≤ 0 | Off |
|  | Floating | All Input Devices On, except touch screen | On | x=0<br>y=0<br>z=-1 | Off |
| 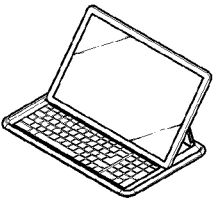 | Clamshell | All Input Devices On | On | x=0<br>y=-1<br>z=-0.5 | On |

100'

ELECTRONIC APPARATUS, METHOD OF CONTROLLING ELECTRONIC APPARATUS AND COMPUTER-READABLE RECORDING MEDIUM

CROSS-REFERENCE TO RELATED APPLICATIONS

This application claims priority from Korean Patent Application No. 10-2013-0166390 filed on Dec. 30, 2013, in the Korean Intellectual Property Office, the disclosure of which is incorporated herein by reference in its entirety.

BACKGROUND OF THE INVENTION

1. Field of the Invention

Apparatuses and methods consistent with exemplary embodiments relate to an electronic apparatus, a method of controlling an electronic apparatus, and a computer-readable recording medium, and more particularly, to an electronic apparatus capable of controlling functions of the electronic apparatus according to a shape of disposition of a display, a method of controlling the electronic apparatus, and a computer-readable recording medium.

2. Description of the Related Art

A notebook personal computer (PC) indicates a computer in the size of a notebook, which is easy to carry by a user. Recently, a slate PC and a tablet PC having a display with a touch screen without a keyboard input unit are widely used for improved portability thereof.

However, a tablet PC has a display and no keyboard, and has less usability and functionality as compared to a general PC due to a thin width and light weight thereof.

A conventional notebook PC and a tablet PC have advantages and disadvantages, and thus, a convertible PC which has advantages of both of a notebook PC and a tablet PC is proposed. A convertible PC is an apparatus which operates as a tablet PC or a notebook PC according to a disposition of a display.

However, when a convertible PC operates as a tablet PC, the display is disposed in a way that the keyboard may not be used. Despite this fact that the display is disposed such that the keyboard is not in a usable state, a conventional convertible PC may not control an operation state of the unused keyboard, and power is therefore wasted.

SUMMARY OF THE INVENTION

Exemplary embodiments of the disclosure provide an electronic apparatus which is capable of controlling the electronic apparatus according to a disposition of a display thereof, a method of controlling the electronic apparatus, and a computer-readable recording medium.

Additional features and utilities of the present general inventive concept will be set forth in part in the description which follows and, in part, will be obvious from the description, or may be learned by practice of the general inventive concept.

Exemplary embodiments of the present inventive concept provide an electronic apparatus including a keyboard configured to receive a user manipulation command, a display configured to display an image according to the received manipulation command, a link unit configured to connect the keyboard with the display, a first detector configured to detect disposition of the keyboard and the display, a second detector configured to detect rotation of the display, and a controller configured to control at least one of an operation state of the keyboard and a function of the electronic apparatus according to the detected disposition and rotation.

The controller may determine an operation state of the electronic apparatus as one of a tablet state, a stand state, a floating state, and a clamshell state according to the detected disposition and rotation.

The controller, in response to the operation state of the electronic apparatus being a tablet state, may control the keyboard not to operate.

The controller, in response to the operation state of the electronic apparatus being a tablet state or a stand state, may control the CPU to operate with limited CPU performance, and in response to the operation state of the electronic apparatus being a floating state or a clamshell state, may control the CPU to operate with a maximum performance.

The display may further include a touch sensor which receives a touch command, wherein the controller, in response to the operation state of the electronic apparatus being a tablet state or a clamshell state, may control the touch sensor to operate, and in response to the operation state of the electronic apparatus being a stand state or a floating state, may control the touch sensor not to operate.

The first detector may detect the disposition of the keyboard and the display using a lid switch, and the second detector may detect rotation between the keyboard and the display using at least one of a gyro sensor and an accelerometer.

The apparatus may further include a first body where the keyboard is disposed thereon, a second body where the link unit is disposed thereon, and a third body where the display is disposed thereon.

The second body may include a port to communicate with an external apparatus, wherein the controller, in response to an operation state of the electronic apparatus being a table state, may disable power supply to the port.

The second detector may be disposed on the third body.

The controller may be at least one of a BIOS and a Micom.

Exemplary embodiments of the present inventive concept also provide a method of controlling an electronic apparatus, the method including detecting a disposition between a keyboard and a display thereof; detecting a rotation state of the keyboard and the display; and controlling at least one of an operation state of the keyboard and a function of the electronic apparatus according to the detected disposition and rotation.

The method may further include determining an operation state of the electronic apparatus as one of a tablet state, a stand state, a floating state, and a clamshell state according to the detected disposition and rotation, wherein the controlling may control an operation state and a CPU performance according to the determined state.

The controlling may include, in response to an operation state of the electronic apparatus being a tablet state, controlling the keyboard not to operate.

The controlling may include, in response to the operation state of the electronic apparatus being a tablet state or a stand state, controlling the CPU with limited CPU performance, and in response to the operation state of the electronic apparatus being a floating state or a clamshell state, controlling the CPU to operate with a maximum performance.

The controlling may include, in response to the operation state of the electronic apparatus being a tablet state or a clamshell state, controlling a function to receive a touch command of a user of the display to operate, and in response to the operation state of the electronic apparatus being a stand state or a floating state, controlling a function to receive a touch command of a user of the display not to operate.

The detecting the disposition may include detecting the disposition between a keyboard and a display using a lid switch, and wherein the detecting the rotation comprises detecting the rotation between the keyboard and the display using at least one of a gyro sensor and an accelerometer.

The electronic apparatus may include a first body where the keyboard is disposed thereon, a second body where the link unit is disposed thereon, and a third body where the display is disposed thereon.

The controlling may include, in response to the operation state of the electronic apparatus being a table state, disabling power supply to the port.

Exemplary embodiments of the present inventive concept also provide a computer-readable recording medium including a program to execute a method of controlling an electronic apparatus, the method including detecting a disposition between a keyboard and a display, detecting a rotation of the keyboard and the display, and controlling at least one of an operation state of the keyboard and a function of the electronic apparatus according to the detected disposition and rotation.

Exemplary embodiments of the present inventive concept also provide an electronic apparatus, comprising: a first body including a keyboard to receive input commands; a second body including a CPU and rotatably connected at a first side thereof to the first body; a third body including a touch screen display on a front portion and being rotatably connected at a rear portion to a second side of the second body; a detector device to detect configurations of the combination of the first, second and third bodies with respect to each other; and a controller to control operational states of each of the first, second and third bodies according to the detected configurations of the combination.

In an exemplary embodiment, the operational states of the first, second and third bodies includes an operational state of the keyboard, an operational state of the touch screen of the display and an operational state of inputs of the CPU.

In an exemplary embodiment, the configurations of the combination of first, second and third bodies with respect to each other include a tablet state, a stand state, a floating state and a clam shell state.

In an exemplary embodiment, when an angle of the first body with respect to the third body is detected to be 0 degrees, the controller controls the electronic apparatus to be in the tablet state; when one side of the first body and one side of the third body are rotatably joined with each other at an angle of approximately 30-100 degrees, the controller controls the electronic apparatus to be in the stand state, when another side of the first body is rotatably joined with another side of the third body at an angle of approximately 100-150 degrees, the controller controls the electronic apparatus to be in the clam shell state; and when the third body is not directly joined with the first body, the controller controls the electronic apparatus to be in the floating state.

In an exemplary embodiment, in the tablet state, the controller controls each configuration of the electronic apparatus to operate with a limited CPU performance, not to operate the keyboard, and to operation the touch screen, in the stand state, the controller controls each configuration of the electronic apparatus to operate with maximum CPU performance, to operate the keyboard and not to operate the touch screen, in the floating state, the controller controls each configuration of the electronic apparatus to operate with a restricted CPU performance, to operate the keyboard and not to operate the touch screen, and in the clam shell state, the controller controls each configuration of the electronic apparatus to operate with maximum CPU performance, to operate the keyboard and the touch screen.

In an exemplary embodiment, the detector device comprises a first detector to detect a disposition of the keyboard and the display and a second detector to detect a rotation state of the display.

In an exemplary embodiment, the first body further includes an empty portion in which the second body can be rotated to be seated therein in the tablet state.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 4 is a view provided to explain a power state and a function in various operation state of the electronic apparatus of FIG. 1.

DETAILED DESCRIPTION OF THE PREFERRED EMBODIMENTS

Figure 1:
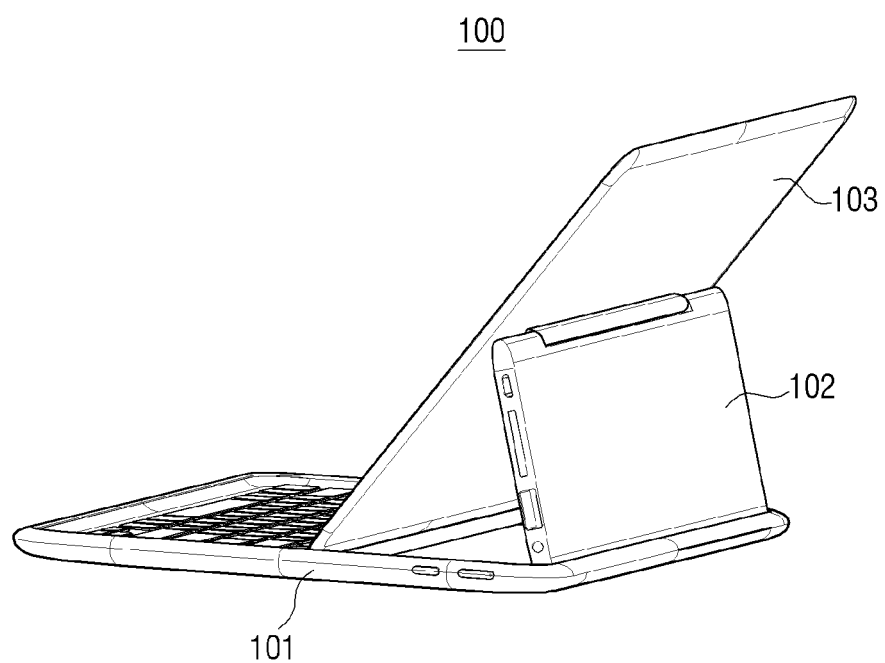
FIG. 1 is a view provided to explain shape of an electronic apparatus according to an exemplary embodiment.

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments may be practiced without those specifically defined matters. Also, well-known functions or constructions are not described in detail because they would obscure the application with unnecessary detail.

FIG. 1 is a view provided to explain shape of an electronic apparatus according to an exemplary embodiment.

Referring to FIG. 1, an electronic apparatus 100 comprises of a first body 101, a second body 102, and a third body 103 according to an exemplary embodiment.

The first body 101 is a configuration where a keyboard is disposed thereon, and is connected to the second body 102 via a hinge. The first body 101 has an empty space where the second body 102 may be disposed. In the illustrated exemplary embodiment, it is described that only a keyboard is provided on the first body 101, but during implementation of the electronic apparatus 100, various input units such as a touch pad, a power switch, and a sound button may be disposed on the first body 101.

The second body 102 (or a link unit) is a configuration where various elements (for example, CPU, memory, storage) are disposed for computing operations of the electronic apparatus 100, which is connected with each of the first body 101 and the third body 103 via a hinge. In the illustrated exemplary embodiment, it is described that only the configuration for computing is disposed on the second body 102, but during implementation of the electronic apparatus 100, a port (USB port, microSD terminal, or the like) may be disposed on the second body 102 to communicate with an external apparatus.

The third body 103 is a configuration where a display is disposed, which is connected with the second body 102 via a hinge. In the third body 103, a detector to detect a disposition of the display is disposed.

The electronic apparatus 100 according to this exemplary embodiment may be disposed in various configurations different from the conventional configurations in that the electronic apparatus is made of three bodies instead of two bodies of a conventional notebook. An operation state of the electronic apparatus 100 may be divided into a plurality of operations according to various disposition configurations. Hereinbelow, an example of the operation state according to the exemplary embodiment will be explained with reference to FIGS. 2A-2D.

FIGS. 2A-2D is a view provided to explain various operations states of the electronic apparatus.

Figure 2A:
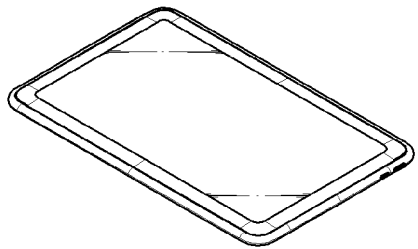
FIGS. 2A-2D are provided to explain various operations states of the electronic apparatus.
Figure 2B:
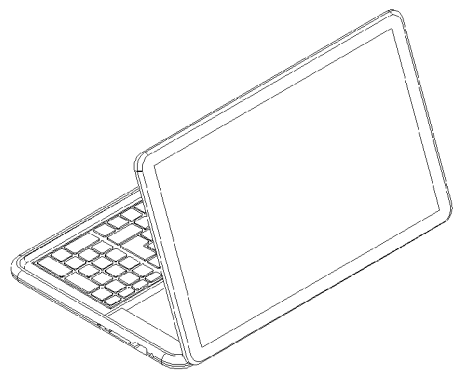
Figure 2C:
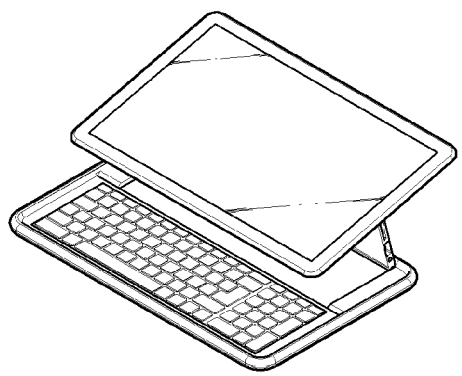
Figure 2D:
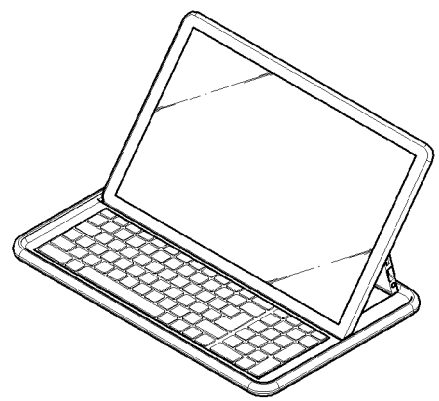

In FIGS. 2A-2D, the electronic apparatus 100 according to the exemplary embodiment has a plurality of operation states according to a disposed configuration of the display. Herein, the plurality of operation states include a tablet state (FIG. 2A), a stand state (FIG. 2B), a floating state (FIG. 2C), and a clam shell state (FIG. 2D).

The tablet state (FIG. 2A) is a mode where a typing area of a keyboard and a display area of a display are disposed with a predetermined first angle in the same direction. This is the state where a display is disposed in the same manner as a conventional tablet PC. That is, the third body 103 covers the first body 101 where a keyboard is disposed. The aforementioned predetermined first angle is approximately 0 degree. In a tablet state, the third body 103 is disposed just above the keyboard, and thus, use of the keyboard is restricted. In addition, the second body 102 is disposed within an empty space within the first body 101, and thus, use of various ports of the second body 102 is also restricted.

The stand state (FIG. 2B) is a new state which is different from a conventional tablet PC and a notebook PC, wherein a typing area of the keyboard and a display area of the display are disposed with a predetermined second angle in the same direction. Herein, the predetermined second angle may be between 0 degree and 180 degree from an axis where one end of the keyboard is joined with one end of the display. The stand state is similar to a known clam shell state, but the third body 103 where the display is disposed thereon is reversely disposed from a hinge which connects the second body 102 with the third body 103.

A floating state (FIG. 2C) is a state where a typing area of the keyboard and a display area of the display are disposed with a predetermined third angle, wherein the display floats in the air. Therefore, the display may be disposed substantially parallel with an upper part of the keyboard. Herein, the predetermined third angle may be between 180 degree and 360 degree (that is, between –0 degree and –180 degree) excluding a fourth angle which will be described later.

The clam shell state (or typing state)(FIG. 2D) is a state where a typing area of the keyboard and a rear area of the display are disposed with a predetermined fourth angle in the same direction. This is the state where the display is disposed on the keyboard with a predetermined angle in the same manner as a conventional notebook PC. To be specific, in the clam shell state, the first body 101 where the keyboard is disposed thereon is disposed in a user direction, and the third body 103 where the display is disposed thereon is also disposed in a user direction. In this case, one side of the third body is disposed on one side of the first body, and together form a shape similar to a general PC. Herein, the predetermined fourth angle is an angle of the first body and the third body when the third body is fixed on one side of the first body. For example, an end of the third body 103 rests at a point above the keyboard of the first body 101 while the second body 102 supports a rear portion of the third body 103 to remain in such a position.

In the above, each of the tablet state, the stand state, the floating state, and the clam shell is divided in an angle between the keyboard and the display, but during implementation, the state may be divided in accordance with the disposition and configuration between the keyboard and the display. This will be explained below with reference to FIG. 4.

Figure 3:
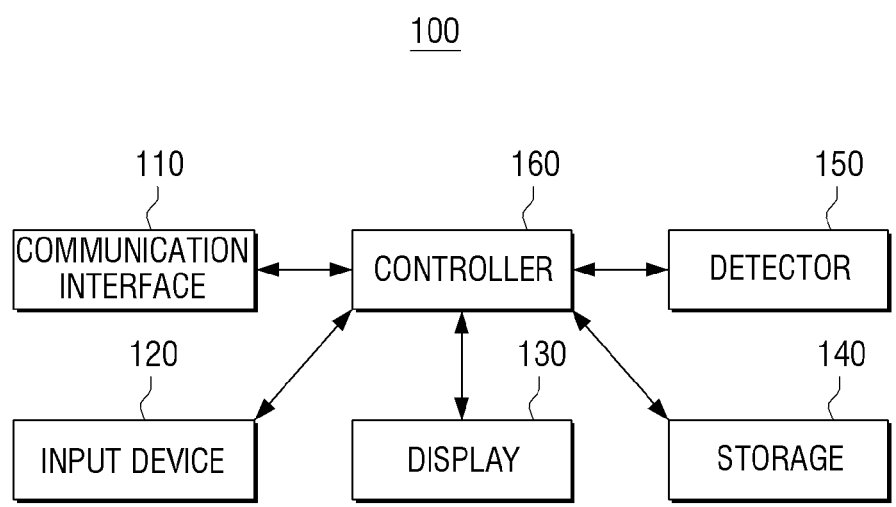
FIG. 3 is view provided to explain the detailed configurations of the electronic apparatus according to an exemplary embodiment.

FIG. 3 is view provided to explain the detailed configurations of the electronic apparatus according to an exemplary embodiment.

In FIG. 3, the electronic apparatus 100 according to the exemplary embodiment may be made of a communication interface 110, an input device 120, a display 130, a storage 140, a detector 150, and a controller 160.

The communication interface 110 is formed to connect the electronic apparatus 100 to an external apparatus (not illustrated), and may be connected to an external apparatus via a local area network (LAN) and Internet network, and also via a wireless communication (for example, global system for mobile communications (GSM), universal mobile telecommunication system (UMTS), long term evolution (LTE), wireless broadband (VViBRO), or the like).

The input device 120 has a plurality of input apparatuses whose functions provided by the electronic apparatus 100 may be set or selected by a user, and receives a user manipulation command. The input device 120 may include a keyboard to receive a text and a number, etc., a touch pad to receive a touch coordinate, a power button to receive a power command, and a volume control button to receive sound up or down controls, or the like. It is desirable that the input device 120 is disposed on the first body 101, but positions of the input device 120 may be provided at locations other than the keyboard, such as, for example, being disposed on the third body 103.

The display 130 may display various information provided by the electronic apparatus 100. The display 130 may display an image according to a manipulation command received through the input device 120. The display 130 may be realized as a touch screen which may receive a user touch command. The display 130 is disposed on the third body 103.

The display 130 may display an operation state of the electronic apparatus 100, and when a performance of the electronic apparatus 100 is restricted, it may be displayed that the apparatus may operate with the restricted performance, and when the apparatus is in an operable state with maximum performance, information notifying that the apparatus may operate with maximum performance may be displayed together.

The storage 140 stores a program to operate the electronic apparatus 100. To be specific, the storage 140 may store a program which is a group of various commands required for operating the electronic apparatus 100. Herein, the program includes not only an application program to provide a particular service but also an operating program to operate the application program. The storage 140 may be disposed on the second body 102.

The storage 140 may be realized as a storage medium within the electronic apparatus 100 and an external storage medium, for example, as a removable disk including a USB memory and a web server through the network, or the like.

The detector 150 detects the disposition of the display. To be specific, the detector 150 may detect an angle of the keyboard and the display, may additionally detect an angle of the horizontal surface of the display, may detect a connection state among each body, and may detect the disposition of the display. The detector 150 may be realized by combining a gyro sensor, an acceleration sensor, and a lid switch. The various embodiments of the detector 150 will be described later with reference to FIG. 5 and FIGS. 7-11. In this exemplary embodiment, the gyro sensor, the acceleration sensor, and the lid switch are used, but in implementation, alternative sensors may be used which provide the intended purposes of detecting the dispositions of and configurations of the keyboard and display, as described herein.

In the present exemplary embodiment, it has been explained that a disposition of the display is detected with one detector, but during implementation, the application of two detectors may be used. That is, the first detector may detect a disposition of the keyboard and the display by using the lid switch, and the second detector may detect a rotation of the keyboard and the display using the gyro sensor and/or an accelerometer. Herein, "disposition" indicates whether the first body 101 where the keyboard is disposed and the third body 103 where the display is disposed are connected, and "rotation" of the keyboard and the display indicates an angle (or configuration) between the first body 101 and the third body 103.

The controller 160 performs control regarding each configuration of the electronic apparatus 100. To be specific, the controller 160 determines an operation state of the electronic apparatus according to the disposition (that is, disposition and rotation) of the display detected by the detector 150. For example, when an angle between the keyboard and the display is 0, the electronic apparatus 100 may determine an operation state as being a tablet state. When one side (end of the first body) of the keyboard and one side of the display are joined with each other, when an angle between the keyboard and the display is 30~100 degrees (this is merely exemplary, and it not limited thereto), the electronic apparatus 100 may determine an operation state as being a stand state. In addition, when another one side (a middle area of the first body) of the keyboard is joined with another side of the display, an angle between the keyboard and the display is 100~150 degrees, an operation state of the electronic apparatus may be determined to be a clam shell (or a typing state). Further, when the display is not joined with the keyboard, an operation state of the electronic apparatus 100 may be determined as being a floating state. It has been described so far that an operation state of the electronic apparatus is determined based on values of angles between the different bodies, but during implementation, an operation state of the electronic apparatus may be determined in consideration of a connection state of each body, or the like.

The controller 160 controls whether each configuration in the electronic apparatus 100 operates according to the determined operation state. To be specific, when an operation state of the electronic apparatus 100 is a tablet state, the controller 160 may control so that the components provided on the first body 101, such as a keyboard, do not operate. As a result of this control, power consumption in the tablet state can be reduced.

Further, when an operation state of the electronic apparatus 100 is a stand state or a floating state, the controller 160 may control that a touch input operation of a touch screen does not operate. When an operation state of the electronic apparatus 100 is a tablet state, the controller 160 may control the configuration of each port provided on the first body 101 not to operate.

In addition, the controller 160 controls CPU performance according to the determined operation state. To be specific, when an operation state of the electronic apparatus 100 is a clam shell state or a stand state, the CPU may be controlled to operate with the maximum performance. On the other hand, when an operation state of the electronic apparatus 100 is a tablet state or a floating state, the CPU may be controlled so that power consumption of the CPU may be reduced.

In addition, the controller 160 controls a direction of screen disposition of the display 150 according to the determined operation state. To be specific, when an operation state of the electronic apparatus 100 is a tablet state, the controller 160 may control that a screen which corresponds to a disposition direction of a display detected by the gyro sensor of the electronic apparatus 100 is output. When an operation state of the electronic apparatus 100 is a clam shell state, the controller 160 may control the display 130 to display a screen which is the same as a general notebook PC. On the other hand, when an operation state of the electronic apparatus 100 is a stand state, the controller 160 may control the display 130 so that a screen in an opposite direction of a general notebook PC is displayed, that is, a screen suitable to a user who is disposed in an opposite direction of the keyboard is displayed (see FIG. 2B).

In addition, the controller 160 may control brightness of a screen of the display 150 according to the determined operation state. For example, when an operation state of the electronic apparatus 100 is a tablet state, the display 130 may be controlled such that a screen having a brightness less than the clam shell state may be displayed.

As described above, the electronic apparatus 100 according to the present exemplary embodiment has various operation states, and may reduce power consumption through the configuration control suitable to various operation states and performance control.

In FIG. 3, it has been explained that the controller 160 determines an operation state of the electronic apparatus, and performs an operation which corresponds to the determined operation state, but in realizing, when a certain angle which determines an operation state is detected without an operation which determines an operation state, the operation may be immediately performed.

FIG. 4 is a view provided to explain a power state and a function in various operation states of the electronic apparatus of FIG. 1.

In FIG. 4, the disposition of the display, a name of an operation state according to the disposition, a performance state of the corresponding operation state, a power control state, a state of output of a lid switch, a detection state of a gyro and acceleration, and an operation state of a touch screen are disclosed.

To be specific, in case of a disposition as illustrated in FIG. 2A, a lid switch which indicates that the first body is separated from the third body outputs an off signal (that is, the keyboard is located adjacent to the display), and the gyro sensor and the acceleration sensor (that is, rotation of the display) may output a value of a certain scope (ex $x=0$, $y=0$, $z=-1$). Accordingly, the controller 160 may determine that an operation state of the electronic apparatus 100 is a tablet state based on an output value of a lid switch and a sensor. When an operation state of the electronic apparatus 100 is a tablet state, the controller 160 may control each configuration of the electronic apparatus 100 to operate with limited CPU performance, not to operate the keyboard, and operate a touch screen. When a touch pad is disposed on the first body 101, the controller 160 may control such that a keyboard does not operate. When a port for connection with an external apparatus is disposed on the second body 102, the controller 160 may restrict power supply such that a port of the second body does not operate.

Further, when the electronic apparatus 100 is disposed as illustrated in FIG. 2B, a lid switch notifying that the first body is disposed apart from the third body outputs an on signal (that is, the keyboard and the display are disposed apart from each other), and the gyro sensor and the acceleration sensor (that is, rotation of the display) outputs a value of a specific scope (ex $x=0$, $y=1$, $z<=0$). Therefore, the controller 160 may determine that an operation state of the electronic apparatus 100 is a stand state based on an output value of a sensor and an output value of the lid switch. When it is determined that an operation state of the electronic apparatus 100 is a stand state, the controller 160 may control each configuration of the electronic apparatus 100 to operate with the maximum CPU performance, and so that the keyboard operates, and the touch screen operates. However, when a touch pad is disposed on the first body 101, the controller 160 may control such that a touch pad operates, and when a port for connection with an external apparatus is disposed on the second body 102, may control such that a port of the second body operates.

In addition, when the electronic apparatus 100 is disposed as illustrated in FIG. 2C, a lid switch notifying that the first body is disposed apart from the third body outputs an on signal (that is, the keyboard and the display are disposed apart from each other), and the gyro sensor and the acceleration sensor (that is, rotation of the display) outputs a value of a specific scope (ex $x=0$, $y=0$, $z<=-1$). Therefore, the controller 160 may determine that an operation state of the electronic apparatus 100 is a floating state based on an output value of a sensor and an output value of the lid switch. When it is determined that an operation state of the electronic apparatus 100 is a floating state, the controller 160 may control each configuration of the electronic apparatus 100 to operate with the restricted CPU performance, and so that the keyboard operates, and the touch screen does not operate. However, when a touch pad is disposed on the first body 101, the controller 160 may control such that a touch pad operates, and when a port for connection with an external apparatus is disposed on the second body 102, may control such that a port of the second body operates.

When the electronic apparatus 100 is disposed as illustrated in FIG. 2D, a lid switch notifying that the first body is disposed apart from the third body outputs an on signal (that is, the keyboard and the display are disposed apart from each other), and the gyro sensor and the acceleration sensor (that is, rotation of the display) outputs a value of a specific scope (ex $x=0$, $y=-1$, $z<=-0.5$). Therefore, the controller 160 may determine that an operation state of the electronic apparatus 100 is a clam shell state based on an output value of a sensor and an output value of the lid switch. When it is determined that an operation state of the electronic apparatus 100 is a clam shell state, the controller 160 may control each configuration of the electronic apparatus 100 to operate with the maximum CPU performance, so that the keyboard and the touch screen both operate. However, when a touch pad is disposed on the first body 101, the controller 160 may control such that a touch pad operates, and when a port for connection with an external apparatus is disposed on the second body 102, may control such that a port of the second body operates.

Figure 5:
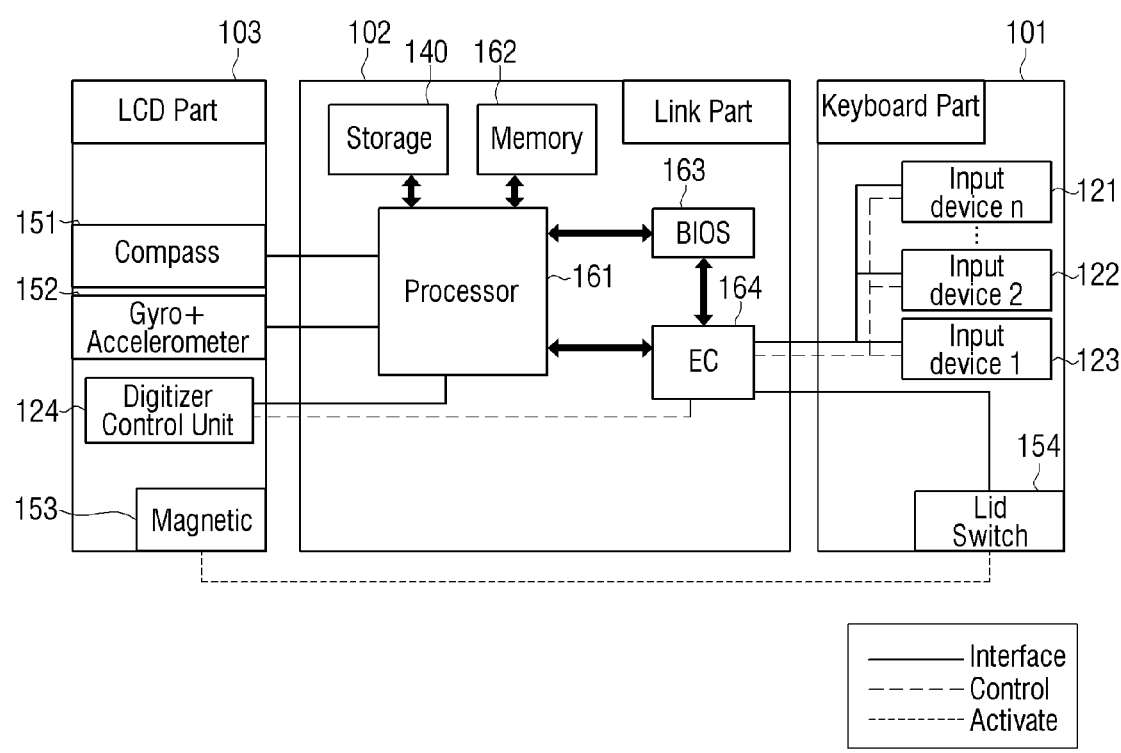
FIG. 5 is a view provided to explain circuit disposition of the electronic apparatus according to the first exemplary embodiment.

The lid switch state and the value of the gyro sensor and the acceleration sensor of FIG. 4 are the values when the lid switch and each sensor are disposed as illustrated in FIG. 5, and thus, if the detector is disposed in another position, the controller 160 may determine an operation state using another value accordingly.

FIG. 5 is a view provided to explain circuit components and dispositions of the components of the electronic apparatus according to an exemplary embodiment. To be specific, the electronic apparatus 100 according to the present exemplary embodiment of FIG. 5 is an embodiment realizing the detector using one lid switch, a gyro, and an acceleration sensor.

The electronic apparatus 100 comprises the first body 101, the second body 102, and the third body 103.

In the first body 101, various input devices 121, 122, 123 are disposed, and a lid switch 154. Herein, the various input devices 121, 122, 123 may be a keyboard, a touch pad, a physical button, or the like.

The lid switch 154 is a sensor which senses whether the electronic apparatus 100 is in a tablet state, and detects whether the third body 103 is located at a preset location on the first body 101. In the exemplary embodiment, it has been explained that the lid switch 154 is disposed on the first body, but when realizing, the lid switch may be disposed in various positions.

In the second body 102, CPU 161, a memory 162, Micom 164, BIOS 163, and the storage 140 are disposed. Though not illustrated, the second body 102 may additionally have a pan and a heat sink to cool the CPU. Further, the second body 102 may have a port to access a storage element such as the Micro SD.

The CPU 161 is an apparatus which decodes a command and executes logics computations or data processing. The CPU 161 performs computations in accordance with a user control command input through the keyboard and the touch screen.

The memory 162 is an element which temporarily stores information required to perform computation processing.

The BIOS 163 is a program which controls the computer and processes the basic functions, when the computer is turned on. To be specific, the BIOS 163, when the electronic apparatus 100 is booted, may perform initialization of each configuration of the electronic apparatus 100 and perform booting. The BIOS 163 may store information on a control state of each configuration in the electronic apparatus 100 according to an operation state of the electronic apparatus 100.

The Micom 164 performs control on various chip sets in the electronic apparatus 100. To be specific, as described above, a function to control CPU performance and a function for power saving control on an operation state may be performed by the Micom 164.

In the third body 103, the display is disposed, and a direction sensor 151, an acceleration sensor 152, a digitizer controller 124 to control a touch screen, and a magnet 153 are disposed.

Figure 6:
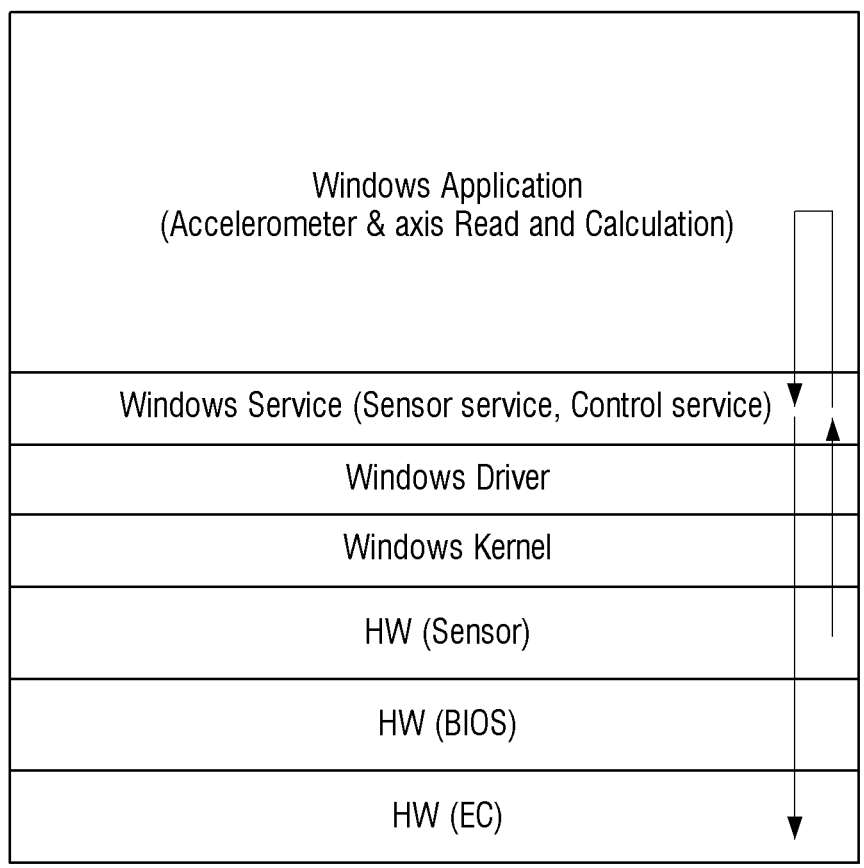
FIG. 6 is a view provided to explain operation architecture of the detector of FIG. 2.

FIG. 6 is a view provided to explain operation architecture of the detector 150 of FIG. 3.

In FIG. 6, when a system is booted, a sensing value of three axis detected by a sensor disposed on the third body 103 is delivered to the system, and the driver converts the sensed sensing value to a specific value. The converted value is made of a table, and is mapped with the converted four operation states. Therefore, by using the converted value, an operation state of the electronic apparatus 100 is determined. When an operation state of the electronic apparatus 100 is determined, performance and power saving configurations in accordance with the determined operation state are selected.

An angle between the keyboard and the display can continuously change by a user selection, and thus, information from each sensor may be analyzed in a real-time basis by using the driver and the software, and BIOS and Micom may set the optimal power state in accordance with the changed angle after receiving the analyzed data.

Figure 7:
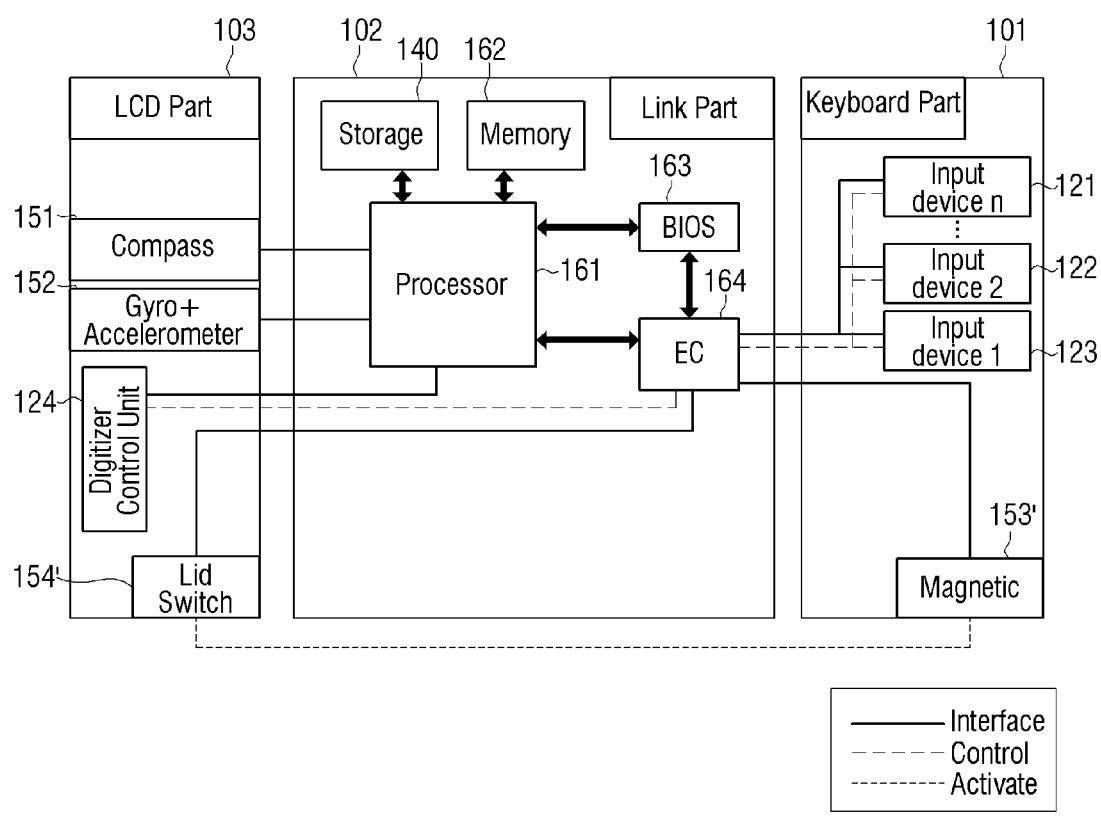
FIG. 7 is a view provided to explain circuit disposition of the electronic apparatus according to the second exemplary embodiment.

FIG. 7 is a view provided to explain circuit disposition of the electronic apparatus according to another exemplary embodiment. To be specific, the electronic apparatus 100' according to this exemplary embodiment is an example of realizing the detector by using one lid switch, a gyro sensor, and an acceleration sensor, and only a location of the lid switch is different from the previous exemplary embodiment of FIG. 5. Other configurations will not be explained further.

Referring to FIG. 7, the lid switch 154' is disposed on the third body 103, and a magnet 153' is disposed on the first body 101. That is, the electronic apparatus 100' according to the exemplary embodiment of FIG. 7 has a format that all the sensors to detect disposition of the display are provided on the third body 103.

Figure 8:
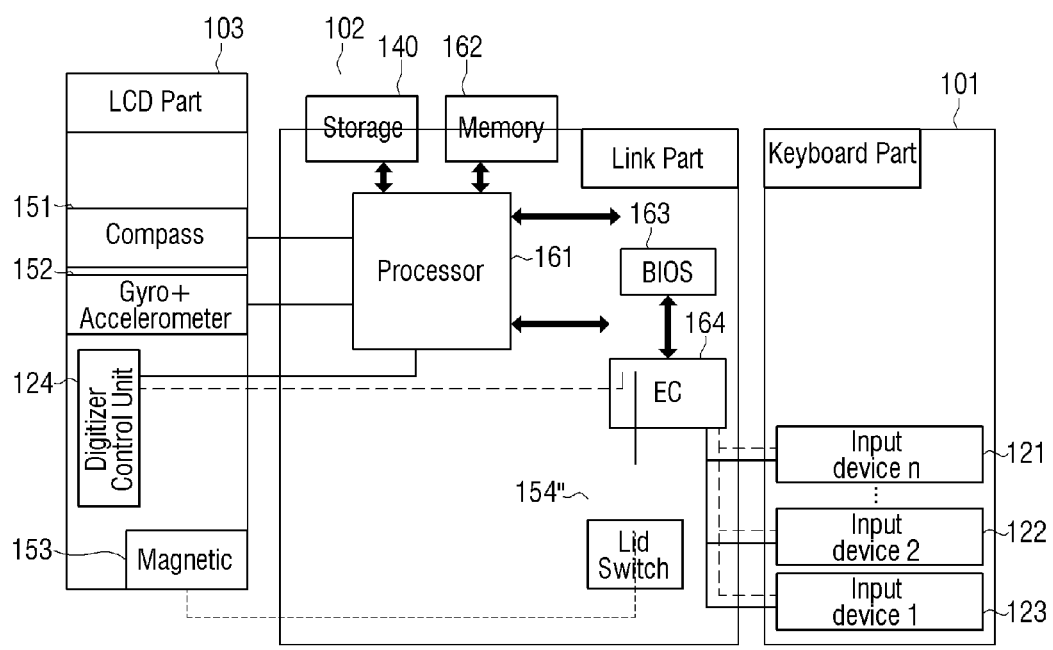
FIG. 8 is a view provided to explain circuit disposition of the electronic apparatus according to the third exemplary embodiment.

FIG. 8 is a view provided to explain circuit disposition of the electronic apparatus according to another exemplary embodiment. To be specific, an electronic apparatus 100" according to the exemplary embodiment of FIG. 8 is an example of realizing the detector by using one lid switch, a gyro sensor, and an acceleration sensor. This is different from the exemplary embodiment of FIG. 5 merely in terms of a location of the lid switch, and thus, other configurations will not be explained further.

In FIG. 8, a lid switch 154" is disposed on the second body 102, while the magnet 153 is disposed on the third body 103 similar to the embodiment of FIG. 5. In this case, the location of the magnet 153 on the third body 153 may be different from the exemplary embodiment of FIG. 5. That is, in the exemplary embodiment of FIGS. 5 and 7, it has been determined whether an operation state is a tablet state or a clam shell state depending on whether the first body and the third body are joined with each other, but the electronic apparatus 100" according to the exemplary embodiment of FIG. 8 determines whether the operation state is a tablet state or a clam shell state according to whether the second body 102 is moved.

Figure 9:
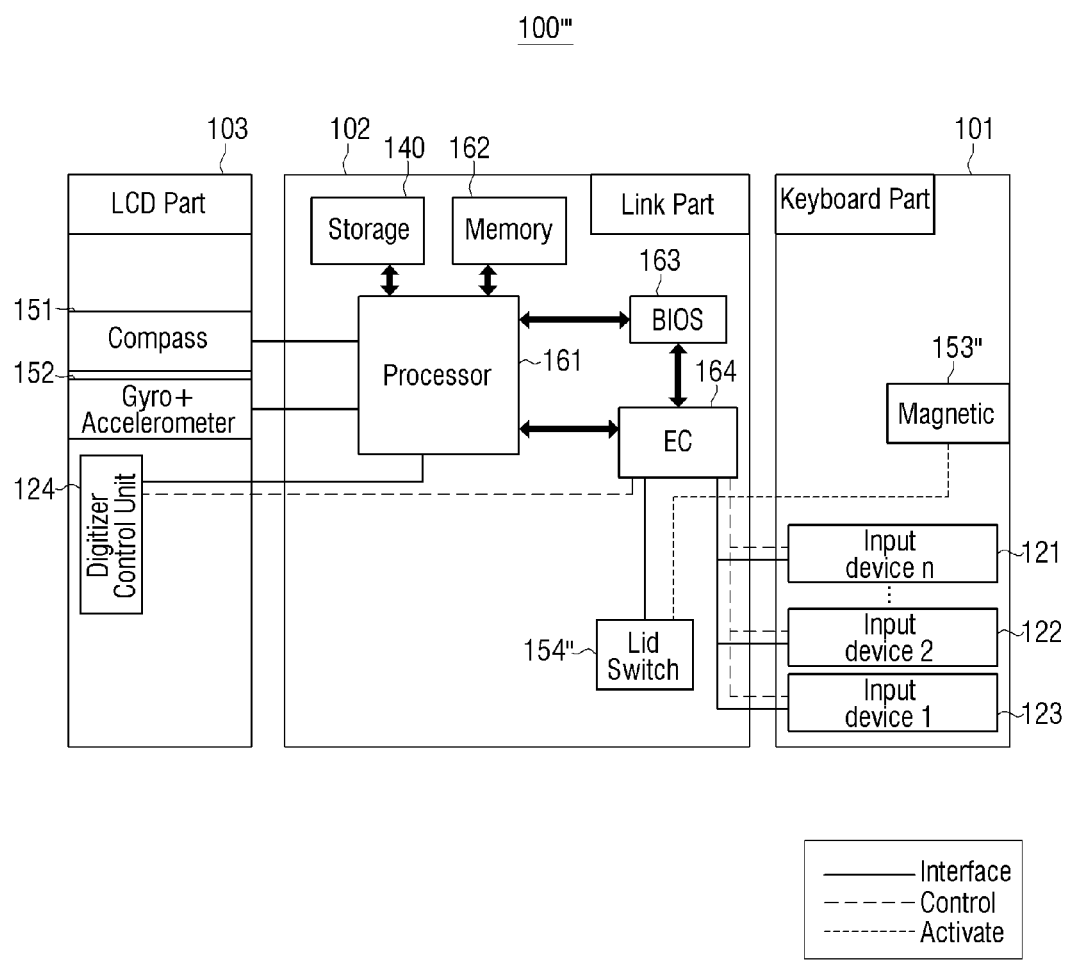
FIG. 9 is a view provided to explain circuit disposition of the electronic apparatus according to the fourth exemplary embodiment.

FIG. 9 is a view provided to explain circuit disposition of the electronic apparatus according to yet another exemplary embodiment. To be specific, the electronic apparatus 100''' according to this exemplary embodiment of FIG. 9 is an example of realizing the detector by using one lid switch, the gyro sensor, and the acceleration sensor. Here, only a location of the lid switch is different from the exemplary embodiment of FIG. 7, and thus, the other configurations will not be described.

Referring to FIG. 9, the lid switch 154" is disposed on the second body 102, and the magnet 153 is disposed on the first body 101. Accordingly, the electronic apparatus 100''' according to this exemplary embodiment can determine whether an operation state is a tablet state or a clam shell state depending on whether the second body 102 and the first body 101 are connected.

Figure 10:
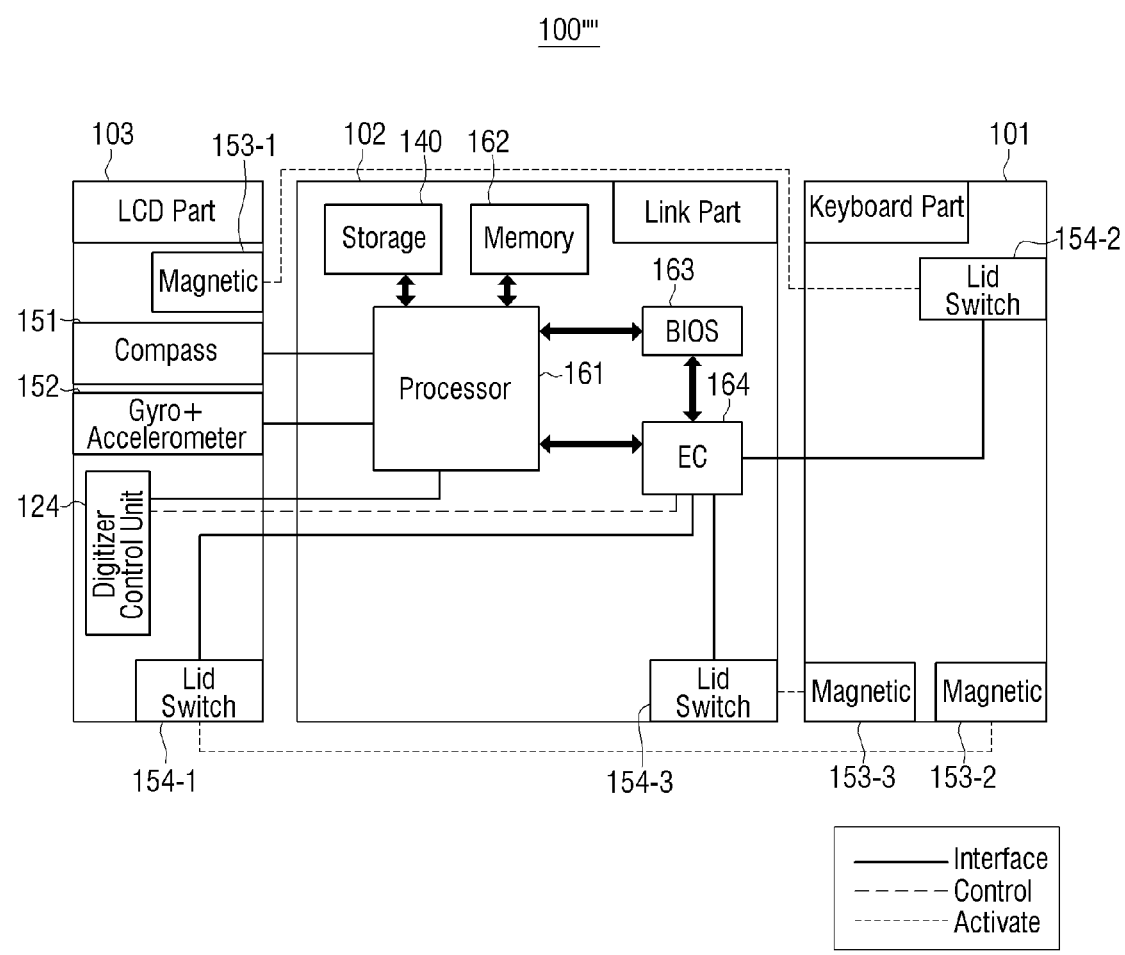
FIG. 10 is a view provided to explain circuit disposition of the electronic apparatus according to the fifth exemplary embodiment.

FIG. 10 is a view provided to explain circuit disposition of the electronic apparatus according to yet another exemplary embodiment. To be specific, the electronic apparatus 100"" according to this exemplary embodiment is an example of realizing the detector by using three lid switches. Only the lid switch is different from the exemplary embodiment of FIG. 5, and thus, other configurations will not be explained further.

Referring to FIG. 10, three lid switches 154-1, 154-2, 154-3 are installed respectively on the first body 101, the second body 102, and the third body 103; two magnets 153-2 and 153-3 are disposed on the first body 101, and one magnet 153-1 is disposed on the third body 103.

That is, the exemplary embodiment of FIG. 10 is an example of determining an operation state according to whether each body is connected, by using three lid switches. To be specific, in case of a tablet state, the second lid switch 153-2 is off, in the case of a clam shell state, the third lid switch 154-3 is off, in the case of a stand state, the first lid switch 154-1 is off. Further, in case of a floating state, all three lid switches are off. Accordingly, the controller 160 may determine an operation state of the electronic apparatus 100 in accordance with a state of three lid switches.

Figure 11:
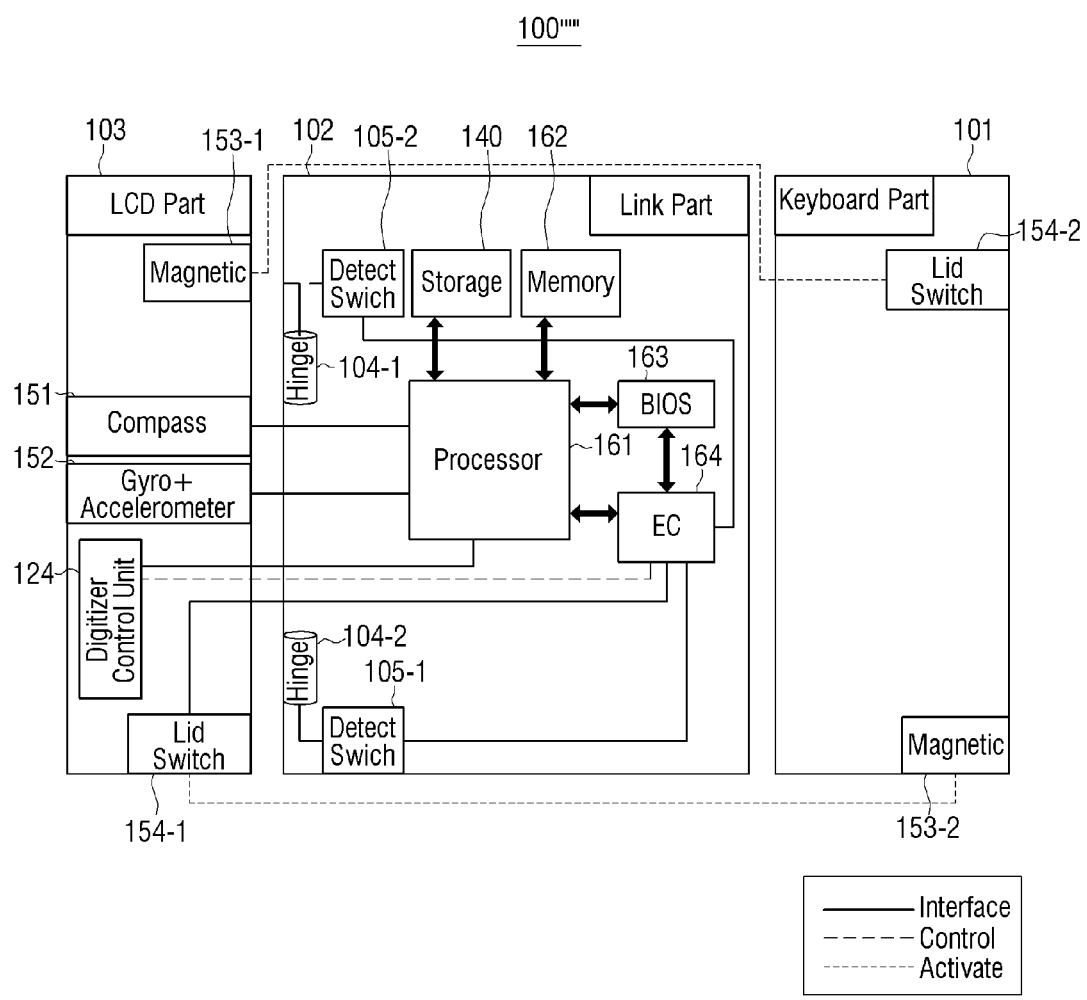
FIG. 11 is a view provided to explain circuit disposition of the electronic apparatus according to the sixth exemplary embodiment.

FIG. 11 is a view provided to explain circuit disposition of the electronic apparatus according to still another exemplary embodiment. The electronic apparatus 100 according to the exemplary embodiment of FIG. 11 is an example of realizing the detector by using two lid switches and one hinge angle sensor. Here, only the configuration of the detector is different from the exemplary embodiment of FIG. 5, and thus, other configurations will not be explained further.

In FIG. 11, the first lid switch (154-1) is disposed on the third body 103, the magnet 153-2 corresponding to the first lid switch is disposed on the first body 101, the second lid switch 154-2 is disposed on the first body 101, and the magnet 153-1 corresponding to the second lid switch 154-2 is disposed on the third body 103. Further, angle detector sensors 105-1 and 105-2 are respectively disposed on the hinges 104-2 and 104-1, which connect the second body and the third body.

Figure 12:
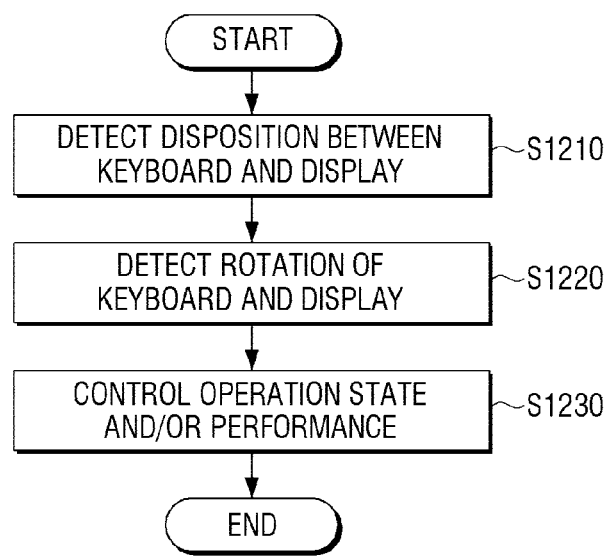
FIG. 12 is a view provided to explain a method for controlling according to an exemplary embodiment.

FIG. 12 is a view provided to explain a method of controlling an electronic apparatus according to an exemplary embodiment.

In FIG. 12, disposition between the keyboard and the display is detected (operation S1210). To be specific, by using a lid switch, the dispositions between the keyboard and the display may be detected.

Rotation of the keyboard and the display may also be detected (operation S1220). To be specific, by using at least one of the gyro sensor and the accelerometer disposed on the display, rotation of the keyboard and the display may be detected. In the above description, it has been explained that disposition is detected first and then rotation is detected, but during implementation, rotation may be detected first and then disposition may be detected later. In addition, disposition and rotation may be detected at the same time.

In accordance with the detected disposition and rotation, at least one of an operation state of the keyboard and a function of the electronic apparatus is controlled (operation S1230). To be specific, first of all, in accordance with the detected disposition and rotation, that is, as illustrated in FIG. 4, an operation state of the electronic apparatus may be determined as one of a tablet state, a stand state, a floating state, and a clam shell state. In accordance with the determined operation state, at least one of an operation state of the keyboard and a function of the electronic apparatus (that is, CPU performance) is controlled.

To be more specific, when an operation state of the electronic apparatus is a tablet state, the keyboard may be controlled not to operate. When an operation state of the electronic apparatus is a tablet state or a stand state, the CPU may be controlled to operate with restricted CPU performance. When an operation state of the electronic apparatus is a floating state or a clam shell state, the CPU may be controlled to operate with the maximum performance. When an operation state of the electronic apparatus is a tablet state or a clam shell state, the touch function of the touch screen may be controlled to operate. When an operation state of the electronic apparatus is a stand state or a floating state, the touch function of the touch screen may controlled not to operate. Further, when an operation state of the electronic apparatus is a tablet state, a port disposed in the second body may be controlled not to operate (or not to supply power).

As described above, a method of controlling an electronic apparatus has various operation states, and may reduce power consumption through configuration control and performance control which suit various operation states. A method of controlling an electronic apparatus as illustrated in FIG. 12 may be executed in the electronic apparatus having the configuration of FIG. 3, and may also be executed in the electronic apparatus having other configurations.

The above-described method of controlling an electronic apparatus may be embodied as a program (or an application) including an executable algorithm which may be executed in a computer, and the program can be stored in a non-transitory computer readable medium and provided.

The non-transitory recordable medium refers to a medium which may store data semi-permanently rather than storing data for a short time such as a register, a cache, and a memory and may be readable by an apparatus. Specifically, the above-mentioned various applications or programs may be stored in a non-temporal recordable medium such as compact disc (CD), digital video disk (DVD), hard disk, Blu-ray disk, USB, memory card, and read-only memory (ROM) and provided therein.

The foregoing embodiments and utilities are merely exemplary and are not to be construed as limiting. The present teachings may also be readily applied to other types of apparatuses. Also, the description of the exemplary embodiments of the present inventive concept is intended to be illustrative, and not to limit the range of the claims, and many alternatives, modifications, and variations will be apparent to those skilled in the art.

What is claimed is:

1. An electronic apparatus, comprising:
a keyboard configured to receive a user manipulation command;
a display configured to display an image according to the received manipulation command;
a link unit configured to connect the keyboard with the display;
a first detector configured to detect disposition of the keyboard and the display;
a second detector configured to detect rotation of the display;
a controller configured to control at least one of an operation state of the keyboard and a function of the electronic apparatus according to the detected disposition and rotation;
a first body where the keyboard is disposed thereon;
a second body where the link unit is disposed thereon; and
a third body where the display is disposed thereon,
wherein the second body comprises a port to communicate with an external apparatus, and
wherein the controller, in response to an operation state of the electronic apparatus being a tablet state, disables power supply to the port.

2. The apparatus as claimed in claim 1, wherein the controller determines an operation state of the electronic apparatus as one of a tablet state, a stand state, a floating state, and a clamshell state according to the detected disposition and rotation.

3. The apparatus as claimed in claim 2, wherein the controller, in response to the operation state of the electronic apparatus being a tablet state, controls the keyboard not to operate.

4. The apparatus as claimed in claim 2, wherein the controller, in response to the operation state of the electronic apparatus being a tablet state or a stand state, controls a CPU of the electronic apparatus to operate with limited CPU performance, and
in response to the operation state of the electronic apparatus being a floating state or a clamshell state, controls the CPU to operate with a maximum performance.

5. The apparatus as claimed in claim 2, wherein the display further comprises a touch sensor which receives a touch command,
wherein the controller, in response to the operation state of the electronic apparatus being a tablet state or a clamshell state, controls the touch sensor to operate, and
in response to the operation state of the electronic apparatus being a stand state or a floating state, controls the touch sensor not to operate.

6. The apparatus as claimed in claim 1, wherein the first detector detects disposition of the keyboard and the display using a lid switch, and
wherein the second detector detects rotation between the keyboard and the display using at least one of a gyro sensor and an accelerometer.

7. The apparatus as claimed in claim 1, wherein the second detector is disposed on the third body.

8. The apparatus as claimed in claim 1, wherein the controller is at least one of BIOS and Micom.

9. A method of controlling an electronic apparatus, comprising:
detecting a disposition between a keyboard and a display of the electronic apparatus;
detecting a rotation of the keyboard and the display; and
controlling at least one of an operation state of the keyboard and a function of the electronic apparatus according to the detected disposition and rotation,
wherein the electronic apparatus comprises a first body where the keyboard is disposed thereon, a second body where a port to communicate with an external apparatus is disposed thereon, and a third body where the display is disposed thereon,
wherein the controlling comprises, in response to an operation state of the electronic apparatus being a tablet state, disabling power supply to the port.

10. The method as claimed in claim 9, further comprising:
determining an operation state of the electronic apparatus as one of a tablet state, a stand state, a floating state, and a clamshell state according to the detected disposition and rotation, wherein the controlling controls at least one of an operation state of the keyboard and performance of a CPU of the electronic apparatus according to the determined state.

11. The method as claimed in claim 10, wherein the controlling comprises, in response to an operation state of the electronic apparatus being a tablet state, controlling the keyboard not to operate.

12. The method as claimed in claim 10, wherein the controlling comprises, in response to the operation state of the electronic apparatus being a tablet state or a stand state, controlling the CPU with limited CPU performance, and in response to the operation state of the electronic apparatus being a floating state or a clamshell state, controlling the CPU to operate with a maximum performance.

13. The method as claimed in claim 10, wherein the controlling comprises, in response to the operation state of the electronic apparatus being a tablet state or a clamshell state, controlling a function to receive a touch command of a user of the display to operate, and when the operation state of the electronic apparatus is a stand state or a floating state, controlling a function to receive a touch command of a user of the display not to operate.

14. The method as claimed in claim 9, wherein the detecting the disposition comprises detecting a disposition between a keyboard and a display using a lid switch, and wherein the detecting rotation comprises detecting rotation between the keyboard and the display using at least one of a gyro sensor and an accelerometer.

15. A non-transitory computer-readable recording medium comprising a program to execute a method of controlling an electronic apparatus, the method comprising:

detecting a disposition between a keyboard and a display of the electronic apparatus;

detecting a rotation of the keyboard and the display; and controlling at least one of an operation state of the keyboard and a function of the electronic apparatus according to the detected disposition and rotation, wherein the electronic apparatus comprises a first body where the keyboard is disposed thereon, a second body where a port to communicate with an external apparatus is disposed thereon, and a third body where the display is disposed thereon, wherein the controlling comprises, in response to an operation state of the electronic apparatus being a tablet state, disabling power supply to the port.

* * * * *